United States Patent
Cheng

(10) Patent No.: US 11,405,270 B2
(45) Date of Patent: Aug. 2, 2022

(54) MOBILE DEVICE CONNECTION DEVICE AND MOBILE DEVICE REMOTE PLUG-AND-PLAY SYSTEM

(71) Applicant: Actions Microelectronics Co., Ltd., Shenzhen (CN)

(72) Inventor: Jian-Chang Cheng, New Taipei (TW)

(73) Assignee: Actions Microelectronics Co., Ltd., Shenzhen (CN)

( * ) Notice: Subject to any disclaimer, the term of this patent is extended or adjusted under 35 U.S.C. 154(b) by 769 days.

(21) Appl. No.: 16/325,251

(22) PCT Filed: Jul. 3, 2018

(86) PCT No.: PCT/CN2018/094340
§ 371 (c)(1),
(2) Date: Feb. 13, 2019

(87) PCT Pub. No.: WO2019/237439
PCT Pub. Date: Dec. 19, 2019

(65) Prior Publication Data
US 2021/0385130 A1    Dec. 9, 2021

(30) Foreign Application Priority Data
Jun. 15, 2018 (CN) .......................... 201810617796.3

(51) Int. Cl.
*H04L 41/0806* (2022.01)
*H04W 84/12* (2009.01)

(52) U.S. Cl.
CPC ......... *H04L 41/0809* (2013.01); *H04W 84/12* (2013.01)

(58) Field of Classification Search
CPC .......................... H04L 41/0809; H04W 84/12
See application file for complete search history.

(56) References Cited

U.S. PATENT DOCUMENTS

| | | | |
|---|---|---|---|
| 8,442,521 B2* | 5/2013 | Fleischman | H04W 12/084 455/432.1 |
| 9,344,237 B2* | 5/2016 | Margulis | H04N 21/4316 |
| 2010/0048244 A1* | 2/2010 | Goren | B60R 25/24 340/426.13 |
| 2011/0286428 A1 | 11/2011 | Souissi | |
| 2015/0036735 A1* | 2/2015 | Smadi | H04L 65/605 375/240.02 |
| 2016/0011999 A1 | 1/2016 | Zhao et al. | |
| 2017/0064215 A1* | 3/2017 | Cho | H04N 21/4532 |

FOREIGN PATENT DOCUMENTS

| | | |
|---|---|---|
| CN | 202998090 U | 6/2013 |
| CN | 103581598 A | 2/2014 |
| CN | 203801037 U | 8/2014 |
| CN | 204539368 U | 8/2015 |
| CN | 206807673 U | 12/2017 |

* cited by examiner

*Primary Examiner* — Duc C Ho
(74) *Attorney, Agent, or Firm* — The Webb Law Firm

(57) ABSTRACT

The present invention provides a mobile device connection device and a mobile device remote plug-and-play system. The mobile device connection device includes a USB port connected to a mobile device and a communication module for wireless communication with a WiFi access point (AP), and the mobile device connection device performs wireless communication through the WiFi AP. Instant plugging and unplugging can be achieved, the distance limitation can also be overcome, and the user experience is good.

6 Claims, 1 Drawing Sheet

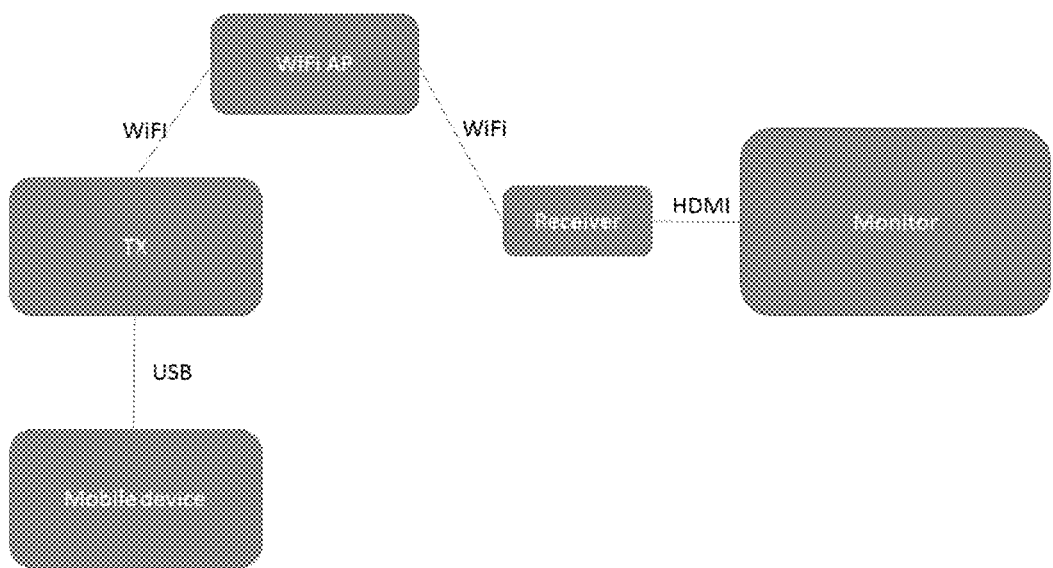

MOBILE DEVICE CONNECTION DEVICE AND MOBILE DEVICE REMOTE PLUG-AND-PLAY SYSTEM

CROSS-REFERENCE TO RELATED APPLICATIONS

This application is the United States national phase of International Application No. PCT/CN2018/094340 filed Jul. 3, 2018, and claims priority to Chinese Patent Application No. 201810617796.3 filed Jun. 15, 2018, the disclosures of which are hereby incorporated by reference in their entirety.

TECHNICAL FIELD

The present invention relates to the field of mobile communications, and in particular, to a mobile device connection device and a mobile device remote plug-and-play system.

BACKGROUND

Sometimes, you need to project an image of a mobile device to a screen in daily life or a work environment. At present, there are mainly two ways to project the image of the mobile device to the screen. One is to connect a receiver through WiFi and project the image. By the adoption of this mode, each time you need to replace a new device for projection, you need to set a service set identifier (SSID) and password with the receiver, and make sure that the mobile device matches the corresponding WiFi; and the other mode is to connect the mobile device to the receiver through a USB port. However, this method is limited by the distance, and is usually limited by the length of a USB cable, that is, between 1-2 meters, and it is impossible to achieve long-distance projection, which is inconvenient to use.

Therefore, it is necessary to provide a mobile device remote plug-and-play system to solve the above problems.

SUMMARY

In view of this, the present invention provides a mobile device connection device and a mobile device remote plug-in system, so that instant plugging and unplugging can be achieved, the distance limitation can also be overcome, and the user experience is good.

To solve the above problems, the present invention provides a mobile device connection device which includes a USB port connected to a mobile device and a communication module for wireless communication with a WiFi AP, where the mobile device connection device performs wireless communication through the WiFi AP.

To solve the above problems, the present invention also provides a mobile device remote plug-and-play system, which includes the mobile device connection device according to claim 1, a WiFi AP in communication with the mobile device connection device, a receiver in communication with the WiFi AP through WiFi, and a monitor connected to the receiver.

Preferably, the monitor is connected with the receiver through a high definition multimedia interface (HDMI).

Preferably, the monitor is a projection screen.

Preferably, a storage module is disposed in the mobile device connection device, and information of all receivers matching the mobile device connection device is stored in the storage module.

Preferably, the mobile device connection device is in a normally connected state with the WiFi AP.

Preferably, the mobile device is instantly connected to the receiver by being inserted into the USB port through a USB connector.

The present invention provides a mobile device connection device which includes a USB port connected to a mobile device and a communication module for wireless communication with a WiFi AP, where the mobile device connection device performs wireless communication through the WiFi AP. Instant plugging and unplugging can be achieved, the distance limitation can also be overcome, and the user experience is good.

BRIEF DESCRIPTION OF DRAWINGS

FIG. 1 is a schematic structural diagram of a mobile device remote plug-and-play system according to the present invention.

DESCRIPTION OF EMBODIMENTS

To make the objectives, technical solutions, and advantages of the present invention clearer, the technical solutions of the present invention are clearly and completely described below. Apparently, the described embodiments are some embodiments of the present invention rather than all embodiments. All other embodiments obtained by those of ordinary skills in the art based on the embodiments of the present invention without creative efforts are within the protective scope of the present invention.

Referring to FIG. 1, the present invention provides a mobile device connection device TX and a mobile device remote plug-and-play system using the mobile device connection device TX.

The mobile device connection device TX is provided with a communication module for being inserted in the mobile device USB port and for implementing WiFi connection.

The mobile device remote plug-and-play system specifically includes a mobile device, a mobile device connection device TX, a WiFi access point (WiFi AP) for implementing a WiFi connection, a receiver connected to a monitor and used for processing real data, and the monitor.

In this embodiment, the monitor is a projection screen, and the receiver processes the data and then is connected to the projection screen through a High Definition Multimedia Interface (HDMI) and outputs the image to the projection screen for achieving image display.

The mobile device is plugged into the mobile device connection device TX through a Universal Serial Bus (USB) connector, and the mobile device connection device TX is connected to the WiFi AP through wireless WiFi. This enables a wireless connection with the receiver connected to the same WiFi network.

A storage module is disposed in the mobile device connection device TX, and the mobile device connection device TX stores data of all the receivers that have been matched with the mobile device connection device TX in the storage device. In this way, the mobile device connection device TX and the receiver only need be paired once. In a powered state, the mobile device connection device TX is in a normally connected state with the WiFi AP.

In this way, an instant connection can be achieved when the mobile device is plugged into the USB port of the mobile device connection device TX through the USB connector.

Since the mobile device connection device TX and the receiver are connected through WiFi, the distance limit of a data connection line of a conventional product can be broken through, and at the same time, and quick plugging and unplugging can be achieved through the USB connection of the USB mobile device connection device TX.

The present invention provides a mobile device connection device and a mobile device remote plug-and-play system. The mobile device connection device includes a USB port connected to a mobile device and a communication module for wireless communication with a WiFi access point (AP), and the mobile device connection device performs wireless communication through the WiFi AP. Instant plugging and unplugging can be achieved, the distance limitation can also be overcome, and the user experience is good.

The above embodiments are only used to illustrate the technical solutions of the present invention, and are not intended to limit the technical solutions. Although the present invention has been described in detail with reference to the foregoing embodiments, those of ordinary skills in the art should understand that they can still modify the technical solutions recorded in each aforementioned embodiment, or perform equivalent substitutions on some of the technical features therein; and such modifications or substitutions do not make the essence of the corresponding technical solution depart from the spirit and scope of the technical solution of each embodiment of the present invention.

What is claimed is:

1. A mobile device remote plug-and-play system, comprising:
    a mobile device connection device which comprises a USB port connected to a mobile device and a communication module for wireless communication with a WiFi access point (AP), and the mobile device connection device performs wireless communication through the WiFi AP,
    the WiFi AP in communication with the mobile device connection device,
    a receiver in communication with the WiFi AP through WiFi, and
    a monitor connected to the receiver.

2. The mobile device remote plug-and-play system according to claim 1, wherein the monitor is connected with the receiver through a high definition multimedia interface (HDMI).

3. The mobile device remote plug-and-play system according to claim 1, wherein the monitor is a projection screen.

4. The mobile device remote plug-and-play system according to claim 1, wherein a storage module is disposed in the mobile device connection device, and information of all receivers matching the mobile device connection device is stored in the storage module.

5. The mobile device remote plug-and-play system according to claim 4, wherein the mobile device connection device is in a normally connected state with the WiFi AP.

6. The mobile device remote plug-and-play system according to claim 4, wherein the mobile device is instantly connected to the receiver by being inserted into the USB port through a USB connector.

* * * * *